May 19, 1942.　　P. A. STURTEVANT　　2,283,707
TORQUE WRENCH
Filed March 28, 1938
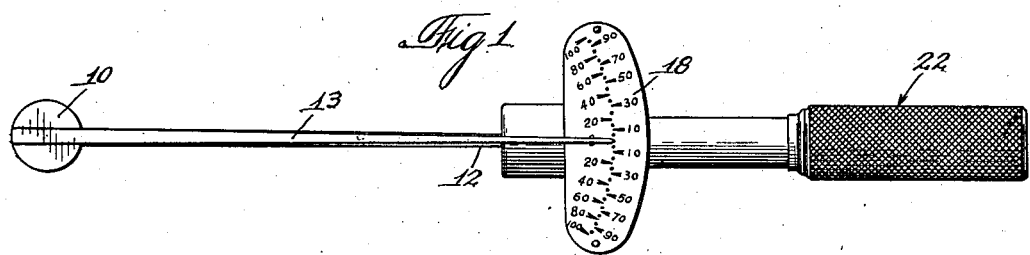
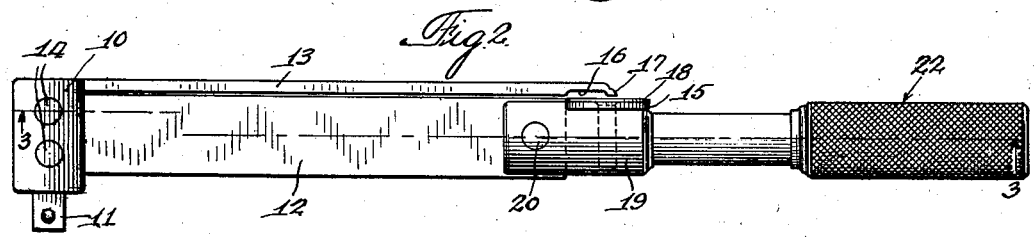
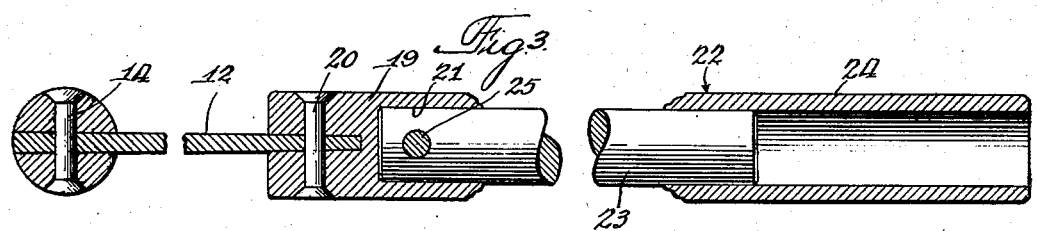
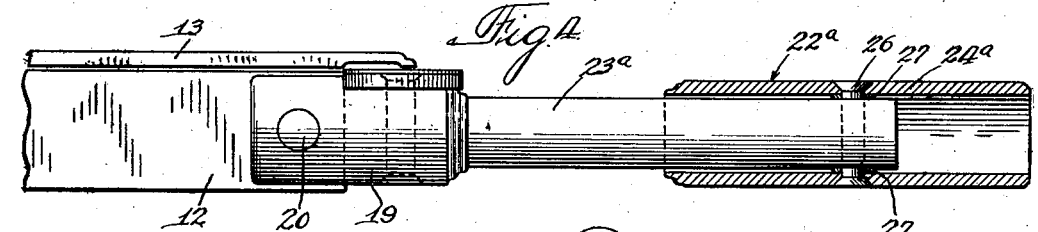
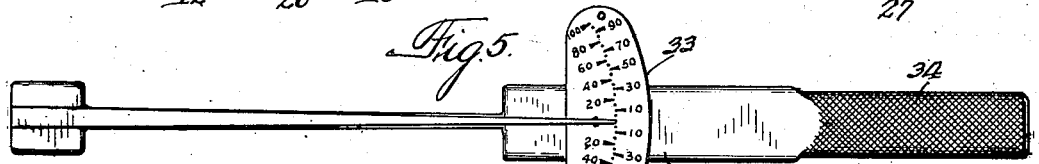
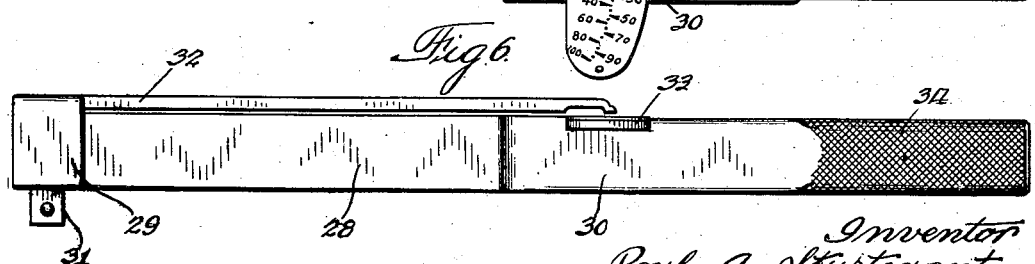
Inventor
Paul A. Sturtevant Patented May 19, 1942

2,283,707

UNITED STATES PATENT OFFICE 2,283,707

TORQUE WRENCH

Paul A. Sturtevant, Elmhurst, Ill.

Application March 28, 1938, Serial No. 198,375

2 Claims. (Cl. 265—1)

This invention relates to a torque wrench and has special reference to a device for applying a tangential force to an object to be rotated and for measuring the applied force.

More particularly, this invention relates to a measuring wrench comprising a head having an object-engaging formation and a measuring beam extending from and fixed to said head with a handle fixed to the free end of the measuring beam, there being a graduated dial on the handle and a pointer for cooperation with the dial to indicate tangential force applied on the handle relative to the object.

In the building of modern high speed motors and subsequent re-building and tune-up work thereon, accurate and uniform tightening of studs and bolts is required. Should the tightening of studs and bolts be unequal and excessive tensions are applied to certain of the cylinder head studs or bolts, distortions and warpage of the cylinder blocks will result causing serious loss of power, increased oil consumption and rapid wear.

Workmen in depending upon their best judgment to apply the same tension to all bolts or nuts on a construction, in many instances, if not in most instances, apply either too little or too much force to the various bolts or nuts operated upon. Field tests have proven that the best of mechanics completely fail to equalize the force applied to the work through their sense of feel acquired through experience.

The present invention contemplates a measuring wrench having a means for determining the force applied to the object and for permitting bolts, nuts or the like to be drawn down to accurate tensions such, for example, as are recommended by the manufacturer. Different constructions and different materials require variations in the applied force and the application of such force by an operator using his best judgment is far from practical.

So far as applicant is aware, all measuring wrenches on the market today depend for the measurement of these applied forces on more or less complicated constructions involving small gears, glass dials, actuating rods, pull strings, and other similar complicated mechanisms. In the use of all of these elements, consideration must be given to the danger of breakage, care in handling, friction of the parts, and other similar things wholly apart from the actual handling of the tool. The absolute absence of friction is necessary to secure and maintain accuracy of measurement and this is not obtained in complicated structures.

In the present invention the head of the wrench is small and without cumbersome projecting devices which construction is essential because operating space is usually limited. The head of the present wrench is but slightly larger than the diameter of the ordinary socket. The measuring beam extending from the head is a simple rugged piece of steel measuring torsions without the aid of levers, coil springs, or gears. The pointer is secured preferably directly to the head and registers without movement on a dial fixed to the handle. The use of such a pointer secured directly to the operating head eliminates racks, pinions, pivots and fragile parts and its construction prevents possible misalignment under ordinary use and even under unreasonable abuse. The dial indicates tensions in either direction and is not necessary to be housed thereby providing easy reading in angular positions and in limited light. Where a dial covering of glass or Celluloid is employed in a construction of this type, these materials are easily scratched or blurred so that a reading of the dial is not readily obtainable.

For purposes of equal distribution of the deflection over the entire length of the beam and for eliminating excessive strain at any one point, the measuring beam is preferably of reduced cross section extending outwardly of the head. In a dial reading, for example, up to a hundred foot pounds, a beam is preferably employed which is never loaded beyond one-half of its elastic limit so as to prevent obtaining a set in the beam which would make its readings inaccurate.

One of the objects of this invention is to provide a measuring wrench of the character indicated above which is compact, light in weight, rugged and permanently accurate.

It is a further object of this invention to provide a measuring wrench of the hereinabove described type in which is eliminated all small gears, glass dials, actuating rods, pull strings and other similar complicated mechanisms which may readily get out of order.

A still further object of this invention is to provide a measuring wrench of the type hereinbefore mentioned in which the measuring beam thereof reduces in cross sectional area outwardly of the head.

It is also an object of this invention to provide a measuring wrench as above noted in which the pointer is of a single piece and is secured directly to the head for direct reading on an open faced dial to obtain a measurement of the torque in foot pounds by direct reading.

Further, it is an object of this invention to provide a head of small size and to eliminate all spacious and cumbersome devices projecting outwardly of the construction so as to permit of the use of the tool in a limited space.

The invention has also for its object to provide a measuring wrench which is simple in construction, is comparatively inexpensive to manufacture, and is durable.

Other objects and advantages of this invention will hereinafter be more particularly pointed out and for a more complete understanding of the characteristic features of this invention, reference may now be had to the following description when taken together with the accompanying drawing, in which latter:

Figure 1 is a top plan view of a measuring wrench embodying the features of this invention;

Fig. 2 is a side elevational view of Fig. 1;

Fig. 3 is an enlarged sectional view taken on the line 3—3 of Fig. 2 with intermediate portions thereof broken away;

Fig. 4 is an enlarged fragmentary sectional view of the handle portion of a wrench showing a modified form of handle construction embodying the features of this invention;

Fig. 5 is a top plan view of a modified form of measuring wrench embodying the features of this invention; and Fig. 6 is a side elevational view of Fig. 5.

Referring now to the drawing and more particularly to Figs. 1 to 3 thereof, the present invention is embodied in a device including a head 10 preferably of cylindrical form having an object-engaging formation 11 extending therefrom in the direction of its axis. The head is preferably formed of chrome vanadium steel or such material as will withstand severe strains. The object-engaging formation 11 may be formed integrally with the head or, of course, may be of a separate piece having, for example, a pressed fit engagement with an aperture in the head.

The head 10 is slotted to receive one end of the measuring beam 12, the slot being preferably milled to the precise measurement of the width of the beam and deep enough to receive the full width of the beam and, for convenience in manufacture, a pointer 13 in a slightly spaced relation to the beam. While the beam may have a pressed fit engagement in the slot of the head, it has been considered preferable, by reason of the hard usage to which such a tool is employed, to double rivet the beam to the head as by means of the rivets 14. The pointer 13, being of relatively small width and depth, is preferably electrically welded to the head although the pointer, of course, may likewise merely have a pressed fit engagement in the slot.

The measuring beam 12 preferably tapers in thickness from the wrench head 10 to an operating handle 22 or, in other words, the beam reduces in cross sectional area outwardly of the head. Such continuous reduction is preferably uniform and while the cross sectional area may be decreased in both width and thickness or in either width or thickness separately, the drawing discloses a preferable condition in merely decreasing in thickness uniformly from the head end to the opposite free end. Such tapering in thickness of the measuring beam distributes the deflection equally over the entire length of the beam for the elimination of excessive strain at any one point.

The pointer extends from the head over the beam and tapers in width to the free end thereof in substantially the same manner as the beam although, of course, this is merely a preference in manufacture and desirable from a standpoint of appearance and for the elimination of an overhanging ledge. The pointer is formed of a single piece preferably of chrome nickel steel, one end thereof being secured directly to the head within the aperture thereof and being stationary therewith. This pointer has no other movement than that imparted to the operating head and registers on a dial 15 carried on the handle, the dial having relative movement with the pointer owing to the deflection of the measuring beam to which the handle is secured.

The pointer is relieved as at 16 over that portion registering with the dial with the exception of the extreme end 17 which is beveled to a line for readily obtaining a correct reading on the dial with the fullest possible vision.

The dial 15 is preferably formed of brass having a cover plate 18 on which readings are determined preferably in foot pounds. The cover plate of the dial is graduated to indicate forces in either direction from a normal setting and the dial 15 is fixed to a yoke 19 of the operating handle 22 which is secured to the free end of the measuring beam 12.

The operating handle 22 includes an extension comprising the yoke 19 and a rod 23, the yoke being preferably a cylindrical member which is slotted to receive the free end of the beam 12. While the beam may be a pressed fit in the slot of the yoke, it is shown as also being riveted thereto by means of a rivet 20, the slot being tapered to conform to the taper of the beam. The end of the yoke opposite to the slotted end is provided with an axial aperture 21 to receive one end of the rod 23, a cylindrical gripping portion 24 telescoping the free end of the rod 23 in a pressed fit. The yoke end of the rod 23 may be a pressed fit in the aperture 21 of the yoke 19, although it likewise is provided with a rivet 25 which, besides acting to secure the rod 23 in position, also secured the dial 15 on a flattened or recessed portion of the yoke.

Referring now more particularly to Fig. 4, a modified form of handle construction is shown on the above described wrench in which the rod 23a of the handle 22a is secured to the yoke 19 extending from the beam 12 in the same manner as has been heretofore discussed. However, the tubular portion 24a of the handle, in telescoping the rod 23a, preferably extends a greater distance over the rod, and the bore of the tube is greater in diameter than the outside diameter of the rod so as to stand spaced therefrom.

The tube 24a of the handle is provided with oppositely disposed apertures preferably centrally of the length thereof in registration with an aperture in the end of the rod 23a for receiving a pin 26. The handle portion 24a, therefore, is pivotally mounted on the rod 23a, or on a projection of the beam, with spacers 27 disposed between the bore of the tubular portion of the handle and the outer periphery of the rod to predetermine the spaced relation thereof.

Torque is the product of a tangential force multiplied by the radius of the part it rotates. The radius in this instance is the distance between the axis of the head 10 and the axis of the pivot 26. In the use of a handle of this character the accuracy of the measurement in foot pounds on the dial is more positive than where the torque is determined by the position of the hand on the handle of the tool. The tubular portion 24 in the previously described embodiment is just about the length of the width of an ordinary hand so that the position of the hand in applying the force to the object is invariably the same in the use of the tool by anyone.

In the use of a longer handle where, for example, one operator may use one handle while another operator may use two hands for applying a substantially greater force, the embodiment shown in Fig. 4 will accommodate any length of handle and always retain the same radius by which the torque is measured. The handle is free floating on the rod and applies the pressure to the rod at the same point at all times when the spacing is maintained between the tubular portion and the rod.

Referring now more particularly to Figs. 5 and 6, a measuring wrench is shown wherein the head, beam and handle are formed of a single piece instead of, as in the heretofore described embodiments, in separate pieces. A single piece of stock may preferably be forged to provide a measuring beam 28 between a head 29 and a handle portion 30. The beam 28 may be tapered in width as in the previously described embodiments and the head 29 has a usual object-engaging formation 31 formed thereon. The top of the head is preferably slotted to receive one end of the pointer 32. the free end of the pointer cooperating with a dial 33 to indicate the measurement of the applied force.

For convenience in operation and to designate the proper point at which force is to be applied to obtain a correct reading of foot pounds on the dial, the extreme end 34 of the handle may be rounded and knurled so that the same radius of torque is maintained by different users and such construction also provides a desirable grip. The operation of the tool shown in Figs. 5 and 6 is the same as that previously described with reference to the first discussed embodiment.

While several embodiments of this invention are herein shown and described, it is to be understood that various modifications thereof may be apparent to those skilled in the art without departing from the spirit and scope of this invention and, therefore, the same is only to be limited by the scope of the prior art and the appended claims.

I claim:

1. A measuring wrench comprising a head having an object-engaging formation, a deflecting measuring beam extending from and fixed to said head, a handle including a gripping portion and an extension, said gripping portion telescoping a portion of said extension in a spaced relation and being pivotally secured at an intermediate portion thereon to said extension, a graduated dial fixed to said handle, and a pointer for cooperation with said dial to indicate tangential force applied on said handle relative to said object.

2. A measuring wrench comprising a head having an object-engaging formation, a deflecting measuring beam extending from and fixed to said head, a handle including a gripping portion and an extension, said extension being fixed to the free end of said beam, said gripping portion being of tubular cross section and telescoping said extension in a spaced relation therewith and being pivotally secured thereto, a graduated dial fixed to said extension, and a pointer for cooperation with said dial to indicate tangential force applied on said handle relative to said object.

PAUL A. STURTEVANT.